United States Patent
Van Gorkom et al.

(10) Patent No.: US 6,525,483 B1
(45) Date of Patent: Feb. 25, 2003

(54) DISPLAY DEVICE COMPRISING A LIGHT GUIDE WITH ELECTRODE VOLTAGES DEPENDENT ON PREVIOUSLY APPLIED ELECTRODE VOLTAGES

(75) Inventors: Gerardus G. P. Van Gorkom, Eindhoven (NL); Siebe T. De Zwart, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/622,808

(22) PCT Filed: Dec. 21, 1999

(86) PCT No.: PCT/EP99/10205

§ 371 (c)(1),
(2), (4) Date: Aug. 22, 2000

(87) PCT Pub. No.: WO00/38163

PCT Pub. Date: Jun. 29, 2000

(30) Foreign Application Priority Data

Dec. 22, 1998 (EP) .............................................. 98204386

(51) Int. Cl.$^7$ ................................................. G09G 3/10
(52) U.S. Cl. ........................ 315/169.1; 315/326; 385/31
(58) Field of Search ........................... 315/169.1, 169.3, 315/326, 337, 339, 357; 313/113, 125, 250; 345/90, 129; 350/285; 385/31, 129

(56) References Cited

U.S. PATENT DOCUMENTS

| | | | | |
|---|---|---|---|---|
| 4,979,149 A | * | 12/1990 | Popovic et al. | ............. 365/244 |
| 5,528,109 A | * | 6/1996 | Heisin et al. | ............. 315/169.4 |
| 5,764,655 A | | 6/1998 | Kirihata et al. | ............ 371/22.5 |
| 5,771,321 A | * | 6/1998 | Stern | ........................... 385/31 |

FOREIGN PATENT DOCUMENTS

EP 0851260 * 12/1997 ........... G02B/26/02

* cited by examiner

*Primary Examiner*—Don Wong
*Assistant Examiner*—Jimmy T. Vu
(74) *Attorney, Agent, or Firm*—Aaron Waxler

(57) ABSTRACT

A display device has row (5) and column (6) electrodes and a movable element (3) and means (17) for supplying voltages to the electrodes. The means supply, in operation, such voltages to the electrodes that use is made of the memory effect of the movable element. More in particular, the electrodes are, in operation, supplied with "on", "off" and "hold" voltages. Simultaneous application of "on" voltages turns a pixel on, simultaneous application of "off" voltages turns a pixel off. Application of a "hold" voltage on either of the electrodes preserves the state of the pixel.

7 Claims, 8 Drawing Sheets

DISPLAY DEVICE COMPRISING A LIGHT GUIDE WITH ELECTRODE VOLTAGES DEPENDENT ON PREVIOUSLY APPLIED ELECTRODE VOLTAGES

BACKGROUND OF THE INVENTION

The invention relates to a display device comprising a light guide, a movable element and selection means to locally bring said movable element into contact with the light guide, said selection means comprising row and column electrodes and means for applying addressing voltages to the row and column electrodes.

A display device of the type mentioned in the opening paragraph is known from U.S. Pat. No. 4,113,360.

In said patent, a description is given of a display device comprising a first plate of a fluorescent material, in which, in operation, light is generated and trapped (so that this plate forms a light guide), a second plate which is situated at some distance from the first plate and, between said two plates, a movable element in the form of a membrane. By applying voltages to addressable electrodes on the first and second plates and to electrodes on the movable element, the movable element can be locally brought into contact with the first plate, or the contact can be interrupted. A transparent contact liquid is present on the contact surfaces. At locations where the movable element is in contact with the first plate, light is decoupled from said first plate. This enables an image to be represented. If the movable element is not in contact with the light guide, it is in contact with the second plate.

For the proper functioning of the display device, it is important that, on the one hand, the contact between the light guide and the movable element can be brought about and interrupted in an accurate and reliable manner, but that, on the other hand, the design is simple and does not require much energy to operate.

It is an object of the invention to provide a display device of the type mentioned in the opening paragraph, which provides a simple and yet reliable device.

To achieve this, the display device in accordance with the invention is characterized in that the selection means comprise means for applying voltages to the electrodes in dependence on a previously applied voltage or voltages on the electrodes.

In the known device, the position of the movable element, i.e. whether or not it makes contact with the light guide is dependent on the applied voltages, and on said voltages only. The inventors have realized that the fact whether or not the movable element moves is dependent on the forces acting on the element. The forces acting on a movable element are not only dependent on the applied voltages, but also on other forces acting on the element and on its position vis-à-vis the electrodes. Said position is also dependent on the history of the element, i.e. previously applied voltages and position. The electric forces acting on the movable element are non-linearly dependent on the distances between the movable element and the electrodes. Because of the non-linear relationship between force and distance, the device exhibits a memory effect. When the movable element is near one of the electrodes, only a relatively large voltage difference between the electrodes can move the element to the other electrode. This, however, also means that once a movable element is in a certain position, it will stay in such a position, even if the voltages applied are changed, provided that they do not change to such a large degree that the movable element is moved to the other electrode. Since the device exhibits a 'memory effect', i.e. it is not only the momentary voltages applied which determine whether or not the movable element moves, but this is also determined by previously applied voltages. Using this insight, one or a number of advantages can be obtained. The device can be simplified, and/or the addressing voltages applied to the device can be simplified and/or the energy required can be lowered and/or the reliability of the device can be increased. Also grey levels can be made, as will be explained.

A preferred embodiment of the device in accordance with the invention is characterized in that the means for applying addressing voltages apply, in operation, a first set of voltages having a lower and an upper value to a row electrode, and a second set of voltages having a lower and an upper value to a column electrode crossing the row electrode at a crossing area, the device being arranged in such a way that only simultaneous application of a lower value to the row electrode and an upper value to the column electrode, or vice-versa, changes the position of the movable element at the crossing area.

Alternatively, a preferred embodiment of the device in accordance with the invention is characterized in that the means for applying voltages apply, in operation, a first set of voltages having a lower and an upper value to a column electrode, and a second set of voltages having a lower and an upper value to a row electrode crossing the column electrode at a crossing area, the device being arranged in such a way that only simultaneous application of a lower value to the column electrode and an upper value to the row electrode, or vice-versa, changes the position of the movable element at the crossing area.

In these embodiments, application of an upper or lower value on one electrode (row or column) alone does not actuate the movable element at the crossing area of the relevant row and column electrodes. Only simultaneous application of a lower value on one of the electrodes, and an upper value on the other, or vice-versa, will actuate the element at the crossing area. Actuating the movable elements becomes very reliable by this measure. Small deviations of applied voltages do not inadvertently switch an element. Basically, only simultaneous application of two 'on' signals on row and column electrode(s) will turn a pixel 'on' when it is 'off', and simultaneous application of two 'off' signals on row and column electrode(s) will turn a pixel 'off' when it is 'on', as will be further explained in the description.

Preferably, the means for applying voltages apply, in operation, a turn-on addressing voltage to a row electrode, while simultaneously applying addressing voltages to a number of column electrodes crossing said first electrodes to bring the movable element in contact with the light guide at selected crossing areas of the row electrode, and subsequently apply said turn-on addressing voltage to a second row electrode while, simultaneously applying addressing voltages to a number of column electrodes crossing said first and second row electrodes to bring the movable element in contact with the light guide at selected crossing areas of the second electrode, the voltage at the first row electrode being in between the turn-on addressing voltage and a turn-off addressing voltage, such that the position of the movable elements at the crossing areas of the first row electrode does not change.

Alternatively, the means for applying voltages apply, in operation, a turn-on addressing voltage to a first column electrode, while simultaneously applying addressing voltages to a number of row electrodes crossing said first column electrode to bring the movable element into contact with the light guide, at selected crossing areas of the first column electrode and subsequently apply said turn-on voltage to a second column electrode, while simultaneously applying voltages to a number of row electrodes crossing said first and second column electrode to bring the movable element into contact with the light guide at selected crossing areas of the second column electrode, the voltage at the first column electrode being in between the turn-on addressing voltage and a turn-off addressing voltage, such that the position of the movable elements at the crossing areas of the first row electrode does not change.

A turn-on addressing voltage is understood to mean a voltage value which, when combined with a given (turn-on) voltage at a crossing electrode, results in bringing the movable element into contact with the light guide at the crossing area.

Likewise, a turn-off addressing voltage is understood to mean a voltage value which, when combined with a given turn-off voltage at a crossing electrode, results in releasing the movable element from the light guide at the crossing area.

These embodiments are based on the following recognition. When the first row or column electrode is supplied with an 'on' signal (turn-on voltage), and a set of crossing electrodes is supplied with 'on' and 'off' signals ('off' meaning 'not on'), only those pixels corresponding to areas where electrodes cross and both carry 'on' signals will be turned 'on'. A first line of picture elements is thus formed.

This step is thereafter repeated for the second (row or column) electrode to form a line of picture elements. However, the voltage at the first row or column electrode is brought to a value between the 'on' and an 'off' value. This means that the first line of picture elements remains visible, i.e. 'on' and the information in said line is preserved. In its simplest form, two lines of picture elements are formed in this manner. It will be clear that this scheme can be expanded to more than 2 lines.

The great advantage is that, while the second (or third etc.) line of picture elements is formed, the first (second etc.) line of picture elements remains 'on'. The total intensity of the light is thereby increased substantially in comparison with arrangements in which (as, for instance, in classical CRTs) only one line of picture elements (or pixels) is activated ('on') at any one time.

This allows multi-line operation, i.e. more than one line (multi-line) is simultaneously active. The lines of picture elements (the video information) could be written in columns or rows. This also allows grey levels to be made.

Preferably, the means for selection supply, in operation, such a sequence of voltages that the percentage of time during which a given row or column electrode is active is approximately (within roughly 50%) uniform for all row or column electrodes, but does show a variation over the device, depending on the distance between the row or column electrode and a nearest light input for the light guide, while the percentage of time during which a given row or column electrodes is active increases as the distance to a nearest light input increases. Light guides show absorption of light. This will cause a reduced uniformity of the light emitted by the display. By increasing the percentage of time during which a row or column electrode is active, this effect can be counteracted to increase the uniformity in the image displayed by the device.

A row or column electrode is active between the time when a turn-on voltage has been supplied to the row or column electrode until a turn-off voltage has been supplied to said row or column electrode.

BRIEF DESCRIPTION OF THE DRAWING

These and other aspects of the invention are apparent from and will be elucidated with reference to the embodiments described hereinafter.

In the drawings.

The Figures are schematic and not drawn to scale, and, in general, like reference numerals refer to like parts.

DESCRIPTION OF THE PREFERRED EMBODIMENTS

Figure 1:
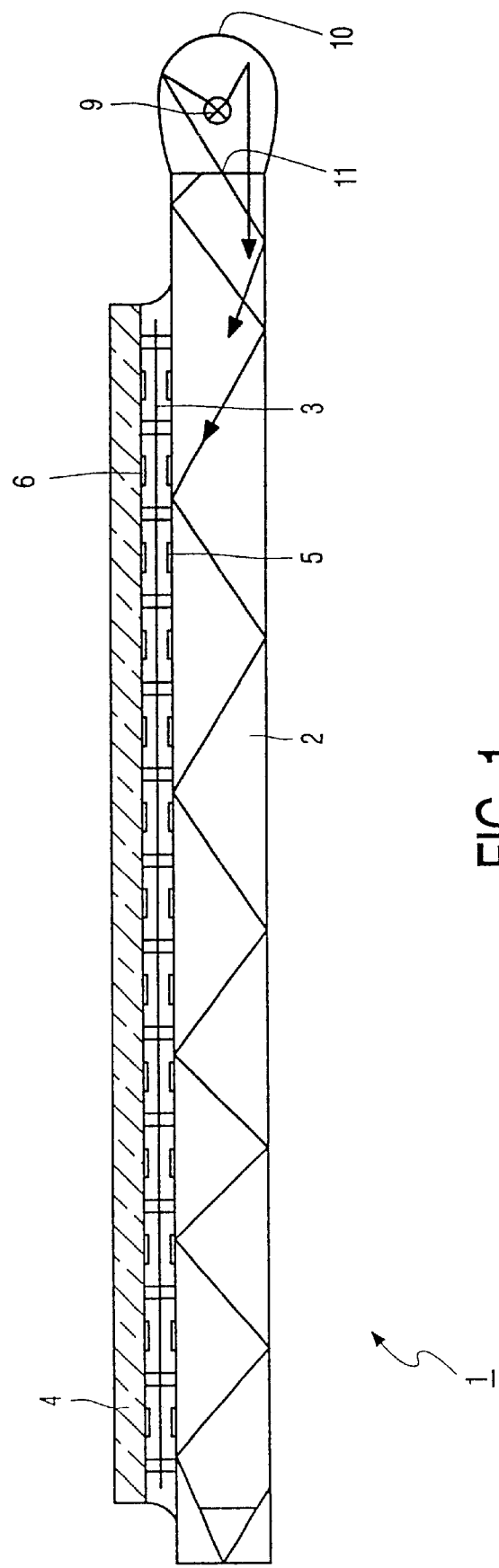
FIG. 1 is a cross-sectional view of a display device in accordance with the invention.
Figure 2:
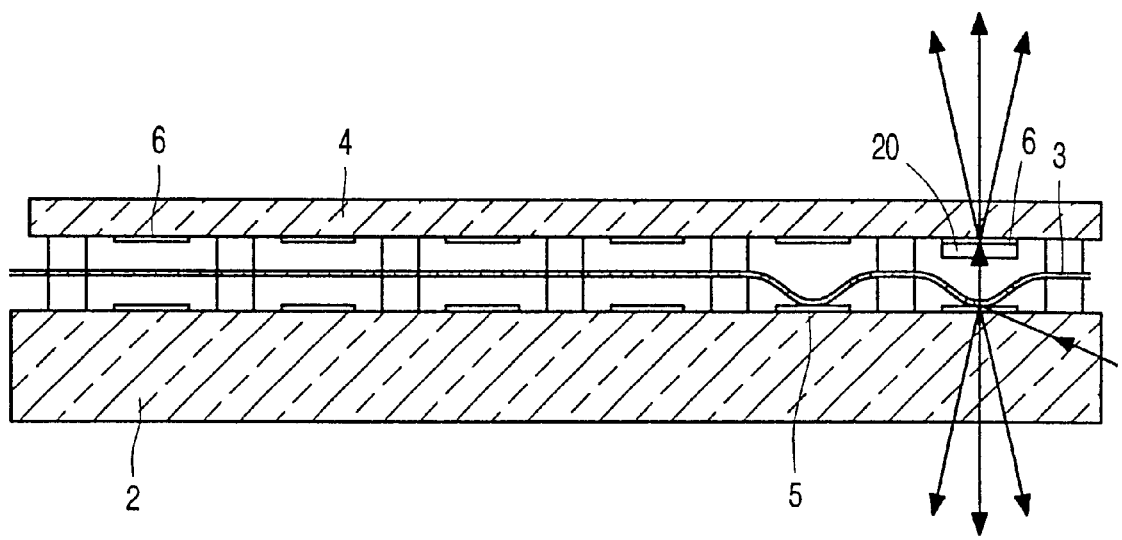
FIG. 2 shows a detail of the display device shown in FIG. 1.

FIG. 1 schematically shows a display device 1 in accordance with the invention. Said display device comprises a light guide 2, a movable element 3 and a second plate 4. Electrode systems 5 and 6 are arranged, respectively, on the facing surfaces of the light guide 2 and of the second plate 4 facing the movable element 3. In this example, the light guide is formed by a light-guiding plate. The electrodes 5 and 6 form two sets of electrodes which cross each other at an angle of preferably 90°. By locally generating a potential difference between the electrodes 5, 6 and the movable element 3, by applying, in operation, electric voltages to the electrodes and the movable element, forces are locally exerted on the movable element, which pull the movable element against the light guide or against plate 4. The display device further comprises a light source 9 and a reflector 10. Light guide 2 has a light input 11 in which light generated by the lamp is coupled into the light guide 2. The lamp may emit white light, or light of any color, depending on the device. It is also possible that more than two lights are present, for instance, a lamp on two sides or on each side of the device. It is also possible to use lamps of different colors sequentially to form a white light display. The light travels inside the light guide and, due to internal reflection, cannot escape from it, unless the situation as shown in FIG. 2 occurs. FIG. 2 shows the movable element 3 lying against the light guide 2. In this state, a part of the light enters the movable element. This movable element scatters the light, so that it leaves the display device. The light can exit at both sides or at one side. In FIG. 2, this is indicated by means of arrows. In embodiments, the display device comprises color-determining elements 20. These elements may be, for example, color filter elements allowing light of a specific color (red, green, blue, etc.) to pass. In a preferred embodiment, a UV lamp is used and UV light is fed into the light guide and leaves the light guide and is incident on phosphor elements. The phosphor elements excited by the UV light emit colored light. The use of UV light and phosphor elements increases the efficiency of the display device.

Figure 3A:
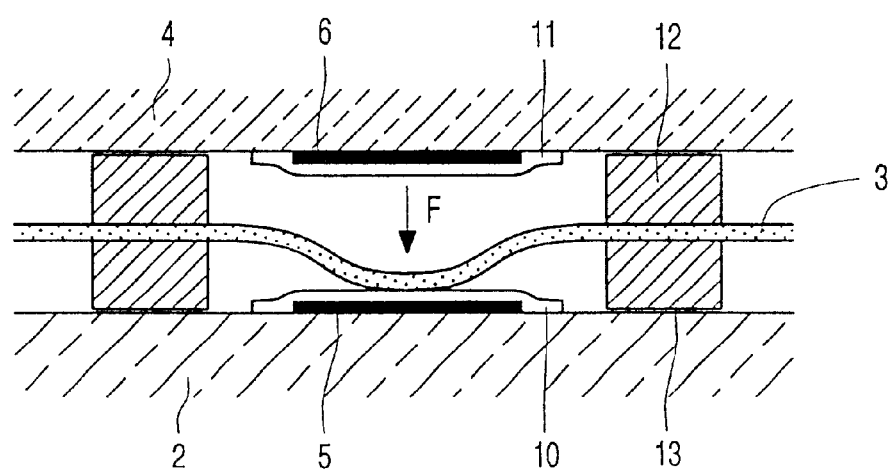
FIGS. 3A, and 3B show further details of the embodiments of the display device shown in FIG. 1.
Figure 3B:
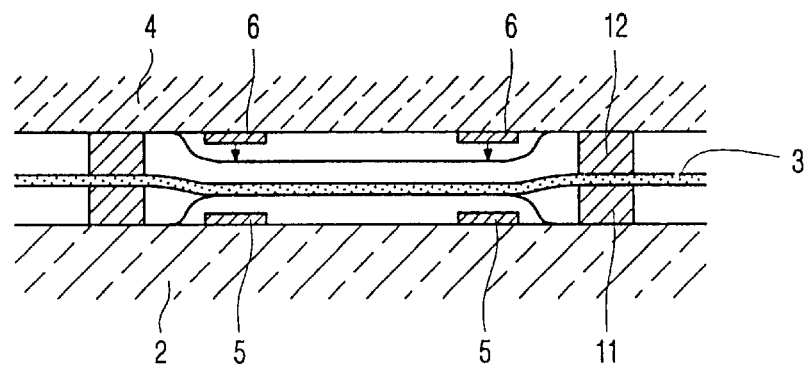

FIG. 3A shows a further detail of the display device shown in FIG. 1. The movable element 3 is positioned between the light guide 2 and the second plate 4 by means of sets of spacers 12 and 13. Electrodes 5 and 6 are covered by insulating layers 10 and 11 in order to preclude direct electric contact between the movable element 3 and the electrodes. By applying voltages to the electrodes and the movable element, an electric force F is generated which presses the movable element against the electrode 5 on the light guide 2. The electrode 5 is transparent. The contact between the movable element and the light guide causes light to leave the light guide and enter the movable element at the location of the contact. In the movable element, the light is scattered and part of it leaves the display device via the transparent electrode 5 and the light guide 2 and a part leaves through plate 4. If non-transparent electrodes are used, as shown in FIG. 3B, these electrodes should be provided next to the location where the optical contact between the light guide 2 and the movable element 3 is brought about. It is also possible to use one set of transparent electrodes, the other being reflective, which increases the light output in one direction. In FIG. 3B, an embodiment comprising two electrodes is shown. This has the drawback that more electrodes must be manufactured, thus causing an increase in costs and a greater risk of picture errors. The use of only one of the electrodes shown has the disadvantage that each of these electrodes must generate a larger force, requiring higher voltages, and the force is exerted asymmetrically.

Figure 4:
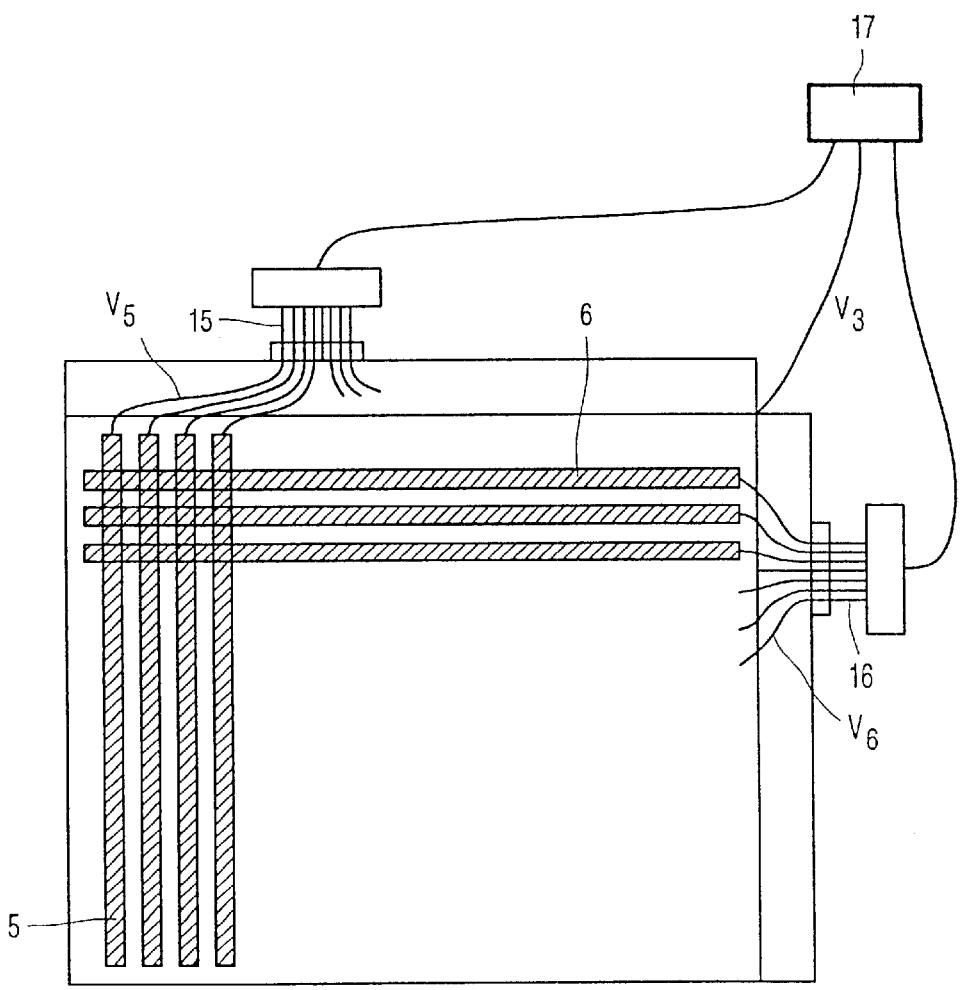
FIG. 4 is a plan view of the display device shown in FIG. 1.

FIG. 4 is a plan view of an embodiment of the display device shown in FIG. 1.

The electrodes 5 and 6 form a matrix structure. From a control unit 17, which comprises selection means, selection signals (electric voltages) are supplied to the electrodes 5 and 6 via the connections 15 and 16. This set of selection signals determines the set of potentials $V_5$ and $V_6$ on the electrodes 5 and 6, which are preferably covered by an insulation layer. Furthermore, a voltage $V_3$ can be applied to the element 3. By applying suitable potential differences to the electrodes 5 and 6 and element 3, the movable element can be actuated, in operation, from and to the electrodes 5 and 6 at the location of the selected crossings of the electrodes 5 and 6. Electrodes 5 form column electrodes, i.e. electrodes extending in the 'short' direction of the rectangular display, while electrodes 6 form the row or line electrodes, i.e. electrodes extending in the 'long' direction of the rectangular display.

Figure 5A:
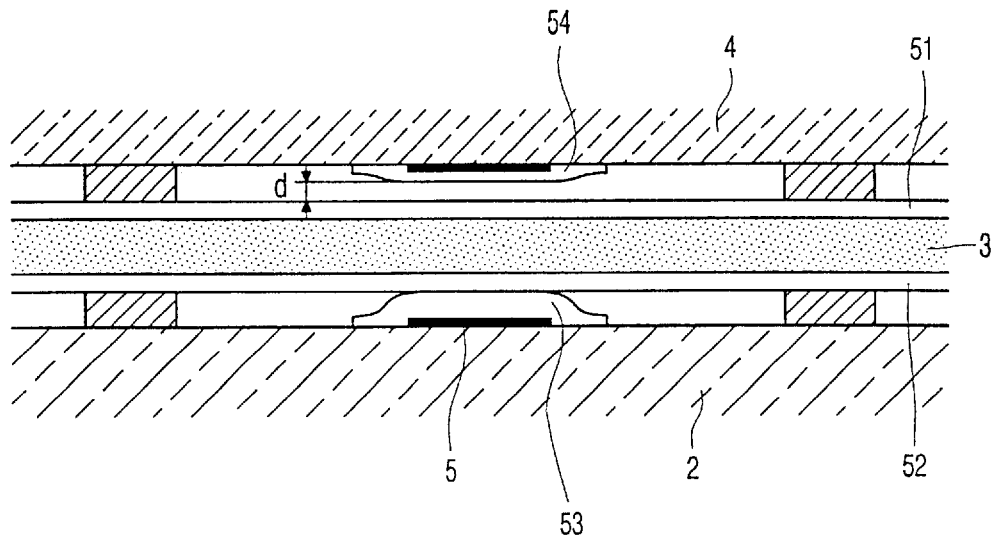
FIG. 5A and 5B show embodiments of the display device in accordance with the invention.
Figure 5B:
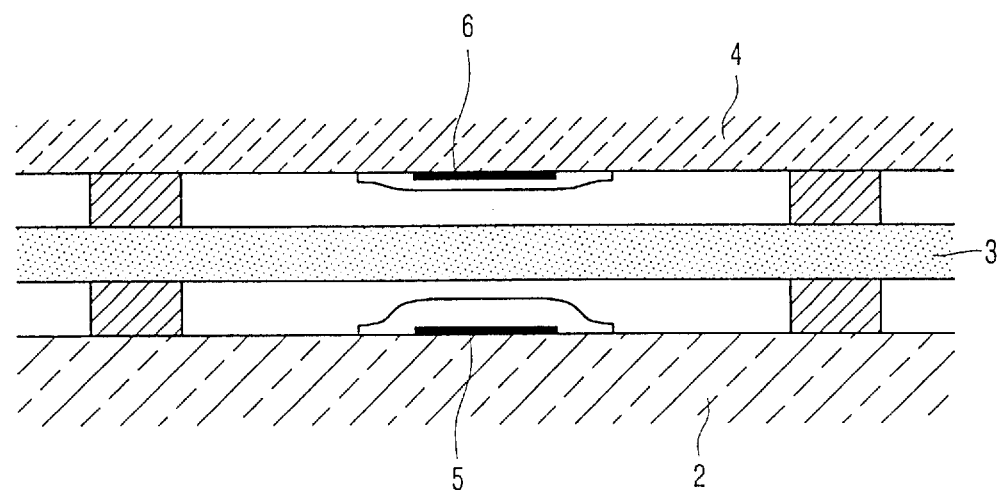

FIGS. 5A and 5B show in more detail a part of the device shown in FIG. 3A.

The force which is locally exerted on the movable element by a potential difference between the electrodes and the movable element is governed by the potential differences, the distances between the electrodes and the movable element and the size of the surface area of the electrodes. The movable element can be actuated by these forces. The electrostatic force F which occurs between two electrodes (or between an electrode and the movable element) is, in the absence of static charges, approximately:

$$F = \tfrac{1}{2}\epsilon_0 (V/(d + \in d_i/\epsilon_i))^2 \cdot S$$

where F is the force, V is the potential difference between the element 3 and an electrode 5 or 6, d is the distance between the outer, facing surfaces of the element 3 and the electrodes 5 or 6 and $d_i$ is the thickness of any layer (e.g. layers 51, 52, 53, 54 in FIG. 5A) on the electrodes and/or element 3, $\epsilon_i$ is the dielectric constant for such a layer and S is the surface area of the electrodes. In the absence of other forces, switching voltages of the order of 10 to 100 V can be used to switch the movable element, i.e. cause it to locally make contact with the light guide or interrupt the contact with the light guide.

Actually, two electro-static forces are acting on each element, one force (force $F_1$) being dependent, amongst others, on the difference in potential between element 3 and electrode 5 and the distance between element 3 and electrode 5 ($V_3 - V_5$), and one force ($F_2$) being dependent on the difference in potential between element 3 and electrode 6 ($V_3 - V_6$) and the distance between element 3 and electrode 6.

The total electrostatic force acting on element 3 in FIG. 5A is:

$$F_{total} = F_1 - F_2 = C((V_3 - V_5)^2/(d_{52}/\epsilon_{52} + d_{53}/\epsilon_{53})^2 - (V_3 - V_6)^2/(d + d_{51}/\epsilon_{51} + d_{54}/\epsilon_{54}))^2)$$

where C is a constant.

Depending on the total magnitude and direction of the electrostatic force, the element 3 will be actuated or not, i.e. move or not. The total electrostatic force acting on movable element 3 will change sign (thus changing from a force directed towards the element to a repulsive force) when $$(V_3 - V_5)^2/(d_{52}/\epsilon_{52} + d_{53}/\epsilon_{53})^2 = (V_3 - V_6)^2/(d + d_{51}/\epsilon_{51} + d_{54}/\epsilon_{54})^2$$

In the absence of other forces (e.g. elastic forces) in the situation depicted in FIG. 5 $V_3 - V_6$ must be larger than $V_3 - V_5$ (by a factor $(d + d_{51}/\epsilon_{51} + d_{54}/\epsilon_{54})^2/(d_{52}/\epsilon_{52} + d_{53}/\epsilon_{53})^2$ to actuate the movable element. Likewise, when movable element 3 is in an upward position, i.e. close to electrode 6, $V_3 - V_5$ must be a factor $(d + d_{52}/\epsilon_{52} + d_{53}/\epsilon_{53})^2(d_{51}/\epsilon_{51} + d_{54}/\epsilon_{54})^2$ larger than $V_3 - V_6$ to move the element. This means that the fact whether or not the movable element 3 is actuated will not only be dependent on the voltages applied, but also on the position of the movable element vis-à-vis the electrodes, and said position is dependent on previously applied voltages, i.e. the history of the element. Thus a memory effect occurs. FIG. 5B shows an embodiment in which layers 51 and 52 are not present.

The invention is based on the recognition that this memory effect is present.

Figure 6A:
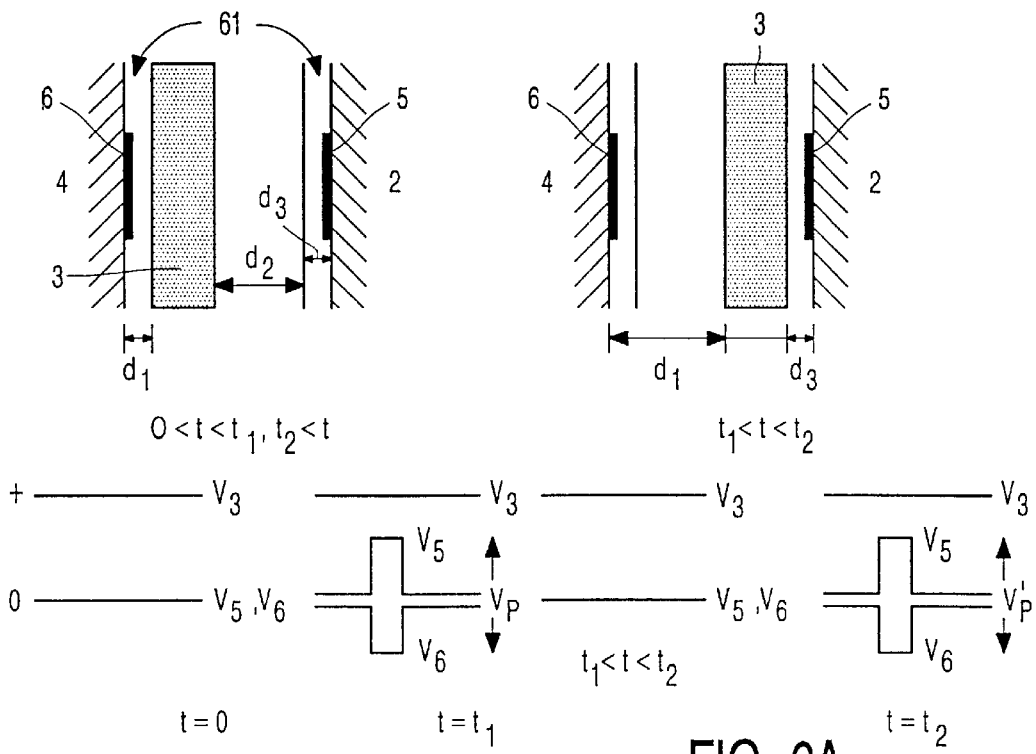
FIGS. 6A and 6B illustrate schematically the memory effect in a device according to an embodiment of the invention and how it is used.
Figure 6B:
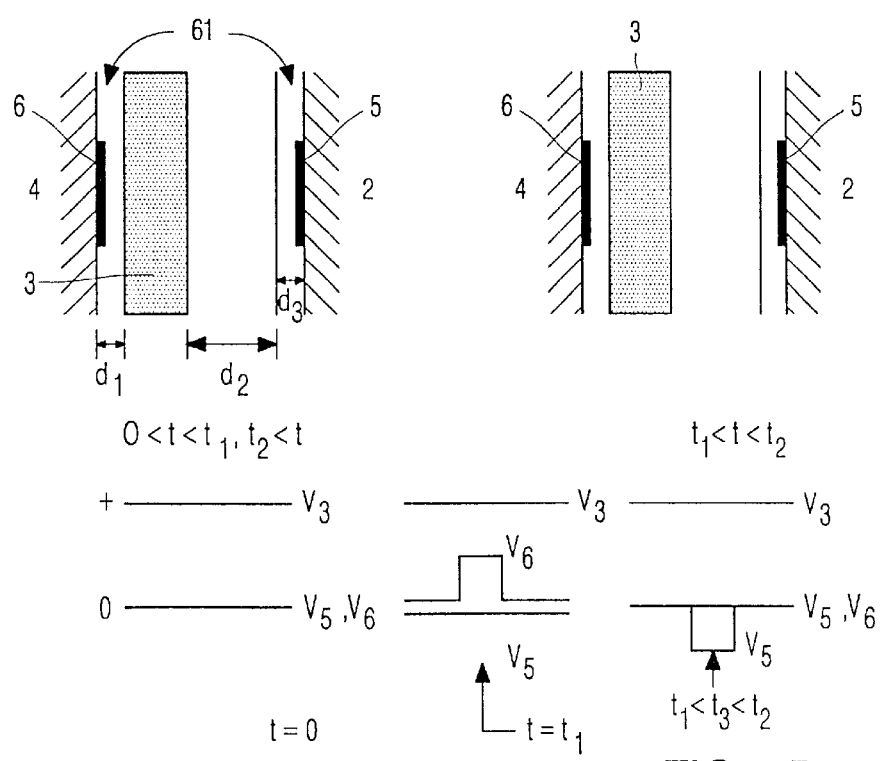

FIGS. 6A and 6B illustrate the memory effect. FIG. 6A shows that, at t=0, movable element 3 is close to electrode 6, separated by a distance $d_1$ from said electrode 6. No light will leave the movable element, i.e. the pixel is 'off'. The movable element is separated from electrode 5 over a relatively large distance $d_2 + d_3$ At $t = t_1$, a pulse is applied to electrodes 5 and 6, reducing the difference in voltage between movable element 3 and electrode 6 and increasing the voltage difference between movable element 3 and electrode 5. This pulse is such that $d_1/\epsilon_1 \times (V_3 - V_6) > (d_2 + d_3/\epsilon_3) \times (V_3 - V_5)$.

This will cause the movable element to move into a position as shown at the right hand side of FIG. 6. The movable element is in contact with plate 2 and thus light is extracted from the light guide and scattered, or in other words, the relevant pixel of the display is 'on'. At $t_1<t<t_2$, the voltages at the electrodes can be maintained at 0, while the position of the element is maintained as it was after the pulse at $t_1$. Although no voltages are applied to electrodes 5 and 6, the pixel thus remains 'on'. A pulse at time $t_2$ reducing the difference in voltages between the electrode 5 and movable element 3 and increasing the voltage difference between electrode 6 and movable element 3 will bring the movable element back to its original position, turning the pixel 'off'. FIG. 6B shows an important aspect of the memory effect. In this Figure, at $t=t_1$, a pulse is given on electrode 6 which reduces the voltage difference between element 3 and electrode 6. No pulse is given on electrode 5. However, the reduction in voltage difference $V_3-V_6$ is not big enough to move the movable element. The relevant pixel will therefore stay 'off'. At $t=t_3$, a negative pulse is given to $V_5$. Again, however, the applied voltages will not cause the element to be moved, so the relevant pixel will stay 'off'. Hence, only the simultaneous application of an 'on' pulse on both electrodes 5 and 6 will switch the element at the crossing to an 'on' position.

Figure 7A:
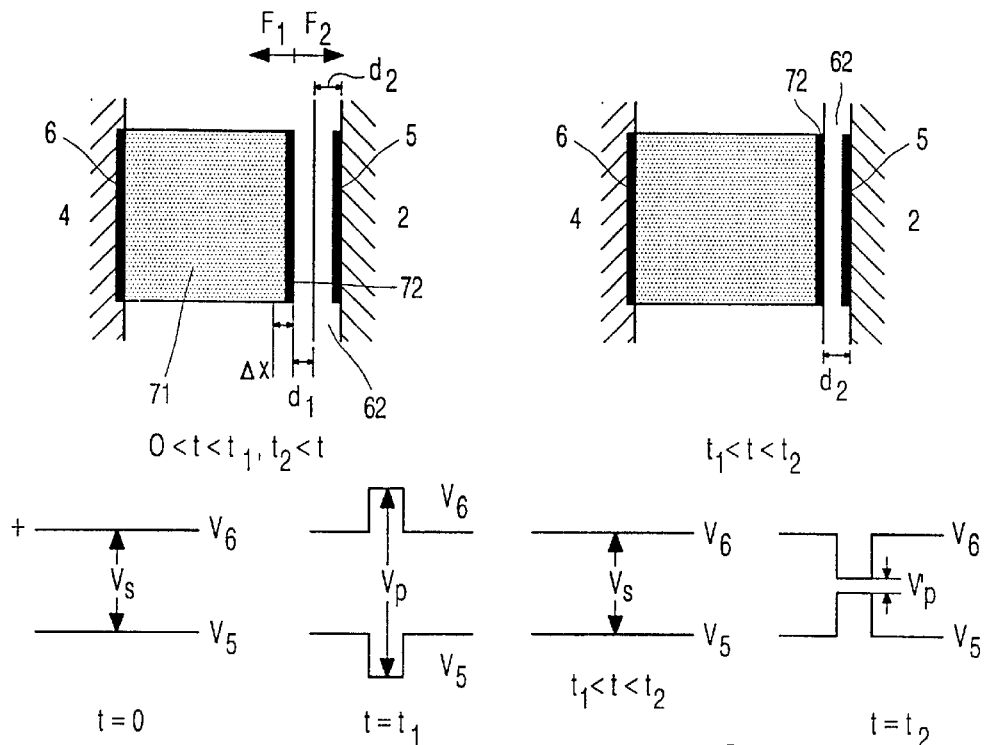
FIGS. 7A and 7B illustrate schematically the memory effect in a device according to another embodiment of the invention.
Figure 7B:
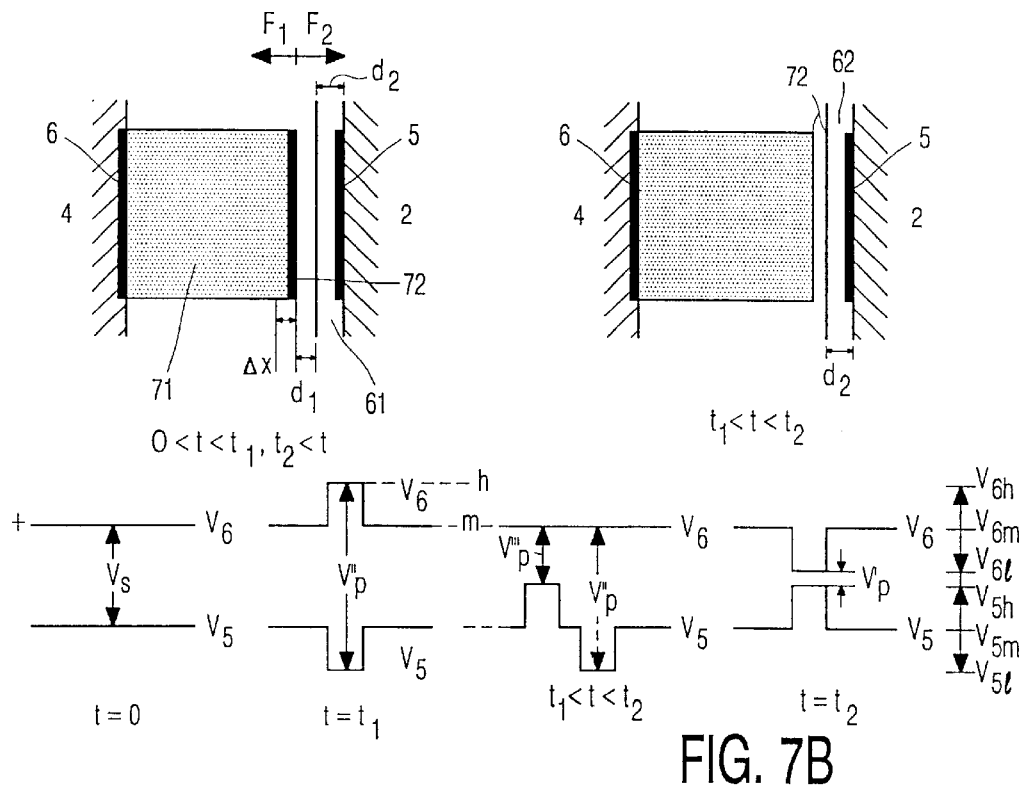

FIGS. 7A and 7B show schematically another embodiment of the invention. In this embodiment, movable element 71 is formed of or by a flexible element, which is either conducting and in electrical contact with electrodes 6, or is provided with electrodes 6 on its surface 72 facing electrodes 5. In this embodiment, 'movable' means that the element may increase in thickness. At t=0, the voltage difference $V_6-V_5$ (FIG. 7A) is applied The voltage difference has such a magnitude that the attractive electrostatic force is balanced by a counter-elastic force. This elastic force is dependent on the elongation Δx.

Thus an electrostatic force $F_1$ attracts surface 72 towards electrode 5, whereas a counteracting elastic force $F_2$ retracts the surface 72 in the opposite direction. Due to the fact that the force $F_1$ is non-linearly dependent on the elongation Δx, a memory effect can be obtained.

At t=0, the voltage difference $V_6-V_5$ equals such a value ($V_s$) that the movable element exhibits a small elongation, but is separated from the insulating layer 61. The pixel is thus 'off'. At $t=t_1$, a large pulse $V_p$ is applied between electrodes 5 and 6. The electrostatic force is thereby increased so that the movable element is elongated and surface 72 touches layer 62 so that the pixel is 'on'. Even though the voltage difference is thereafter ($t_1<t<t_2$) reduced to the original value $V_s$, the movable element stays in the 'elongated', i.e. 'on' status. When, at $t=t_2$, a reduced voltage pulse $V_p'$ is applied, the elastic force becomes larger than the attractive electrostatic force and the movable element is brought back to its original position. The movable element thus shows a memory effect, because the position of the movable element is not only dependent on the actual value of the voltage between the electrodes, but also on previously applied voltages. FIG. 7B illustrates the situation in which, at $t=t_1$, a pulse is given only to electrode 6 so that the voltage is increased to $V_p'$, which value is larger than $V_s$ but smaller than $V_p$. In between $t=t_1$ and $t=t_2$, two pulses can be applied to electrode 5, namely a positive pulse which reduces the voltage difference to $V_p''$ and a negative pulse which increases the voltage difference to $V_p'$. The Figure shows on the left-hand side that $V_6$ in this embodiment has three different values, an upper value ($V_{6m}$), a middle value ($V_{8m}$) and a lower value ($V_{6l}$). Likewise, $V_5$ in this embodiment has three different values, an upper value ($V_{5m}$), a middle value ($V_{5m}$) and a lower value ($V_{5l}$).

Figure 8:
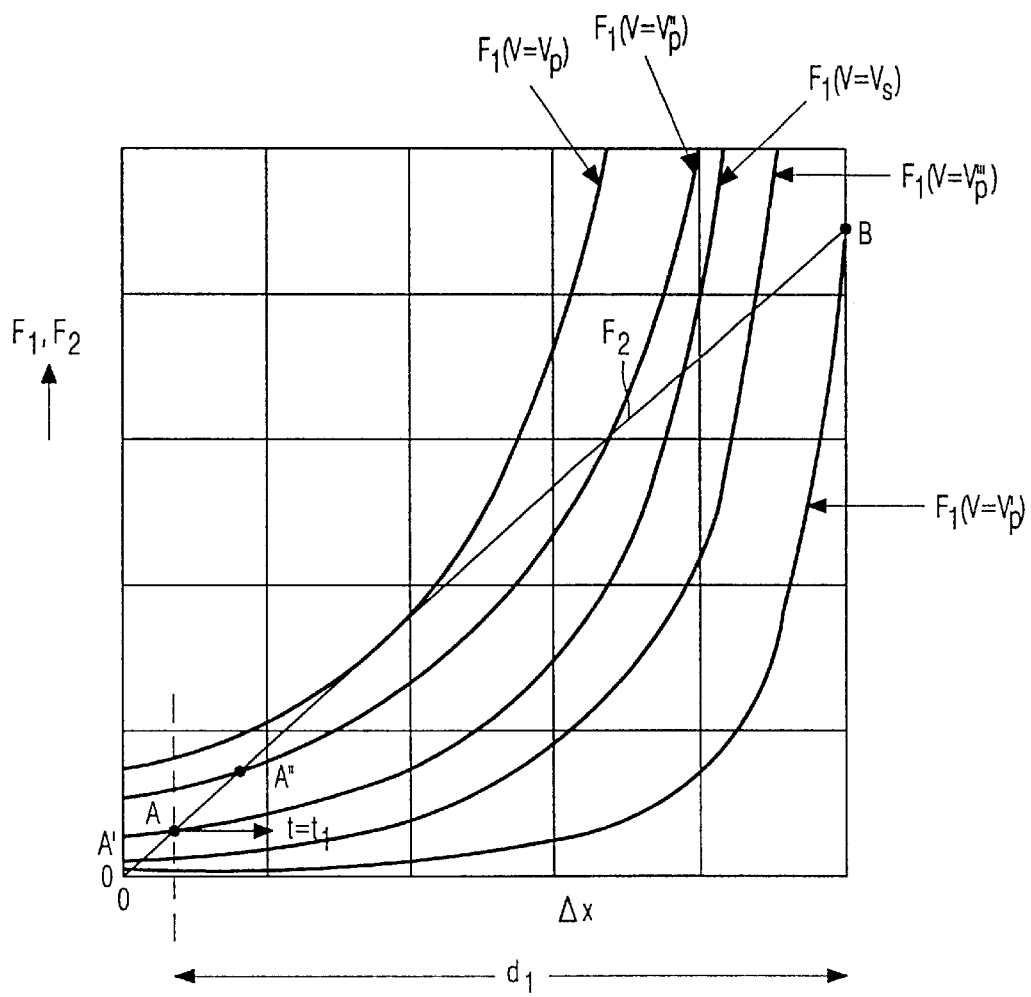
FIG. 8 shows graphically the position of a movable element of FIG. 7 to further illustrate the memory effect.

FIG. 8 illustrates the memory effect by means of a graph in which the forces $F_1$ and $F_2$ are depicted as a function of the elongation Δx and as a function of the applied voltages (for force $F_1$). The Figure shows that force $F_2$ is linearly dependent on the elongation Δx, and the electrostatic force is non-linearly dependent on the elongation Δx. It is this non-linearly dependency which allows a memory effect. When $F_1$ is larger than $F_2$, the element will be elongated and surface 72 will move towards the electrode 5, when $F_1$ is smaller than $F_2$, the surface 72 will move away from electrodes 5. As FIG. 8 shows for $V=V_p$, the electrostatic force $F_1$ is larger than the elastic force for all values of Δx. This means that the electrostatic force will always win and the elongation will increase until the movable element is in contact with layer 62, depicted by point B in FIG. 8, so that applying such a high voltage difference always turns the pixel 'on'. A small voltage difference $V_p'$ means that the electrostatic force is always smaller than the elastic force except for a very small elongation depicted by A' in FIG. 8. Applying such a voltage difference therefore always turns the pixel 'off'. For voltage differences $<V_p$, the situation is as follows. If the pixel is in the 'off' position, it will stay 'off'. At most, the elongation will slightly increase to the situation depicted by A', or decrease slightly, but the elongation will not increase to point B. If the pixel is 'on' (point B in FIG. 8), the pixel will stay 'on' as long as $V>V_p'$ since in these conditions the electrostatic force is always larger than the elastic force. Therefore, the position of the movable element is not only dependent on the applied voltages per se but also on the position of the movable element and hence on previously applied voltages. In a device according to the invention, the selection means comprise means for applying voltages to the electrodes in dependence on a previously applied voltage or voltages on the electrodes.

Table 1 indicates the values for the voltage difference as a function of the voltages applied to electrode 5 ($V_5$) and electrodes 6 ($V_6$) and the action which will follow (pixel is turned on or off). This table holds for both embodiments shown in FIGS. 6A, 6B and 7A, 7B.

TABLE 1

Voltage difference $V_6-V_5$ as a function of voltages applied to electrodes 5 and 6

| voltages applied to 5 and 6 | $V_5 = V_{5h}$ 'off-signal' | $V_5 = V_{5m}$ 'hold-signal' | $V_5 = V_{5l}$ 'on-signal' |
|---|---|---|---|
| $V_6 = V_{6h}$ 'on-signal' | $V_s$ no action | $V_p''$ no action | $V_p$ pixel turned 'on' |
| $V_6 = V_{6m}$ 'hold-signal' | $V_p'''$ no action | $V_s$ no action | $V_p''$ no action |
| $V_6 = V_{6l}$ 'off-sign' | $V_p'$ pixel turned 'off' | $V_p'''$ no action | $V_s$ no action |

Table 1 makes it clear that no action occurs if either $V_5$ or $V_6$ is $V_{5m}$, $V_{6m}$, respectively, i.e. a 'hold-signal' is given to both electrodes. Simultaneous application of 'on-signals' will turn a pixel on, while simultaneous application of 'off-signals' will turn a pixel off. As far as the actions are concerned, the table can be simplified to table 2 below (note that this also means that, instead of three different voltages being applied to electrodes 5, only 2 different voltages $V_{5h}$ and $V_{5l}$ can be applied to the electrodes 5 with the same results):

TABLE 2

Voltage difference $V_6-V_5$ as a function of voltages applied to electrodes 5 and 6

| voltages applied to 5 and 6 | $V_5 = V_{5h}$ | $V_5 = V_{5l}$ |
|---|---|---|
| $V_6 = V_{6h}$ | $V_s$ no action | $V_p$ pixel turned 'on' |

TABLE 2-continued

Voltage difference $V_6$-$V_5$ as a
function of voltages applied to electrodes 5 and 6

| voltages applied to 5 and 6 | $V_5 = V_{5h}$ | $V_5 = V_{5l}$ |
|---|---|---|
| $V_6 = V_{6m}$ | $V_p'''$<br>no action | $V_p''$<br>no action |
| $V_6 = V_{6l}$ | $V_p'$<br>pixel turned 'off' | $V_s$<br>no action |

Table 2 shows that, when $V_6=V_{6m}$, the status of the pixel is preserved, whatever the value for $V_5$. Pixels which are 'off' stay 'off' and pixels which are 'on' stay 'on'. For the rest of the description, $V_{6m}$ will be described as $V_{6hold}$, i.e. the value for which the status of each pixel is held, i.e. not changed, $V_{6h}$ will be described as $V_{6on}$, i.e. the value for $V_6$ for which a pixel could be turned 'on', provided the value for $V_5$ is $V_{5l}$, and $V_{6l}$ will be described as $V_{6off}$, i.e. the value for $V_6$ for which a pixel could be turned 'off', provided the value for $V_5$ is $V_{5h}$.

Since the scheme in table 2 is simpler than that shown in table 1, it illustrates a preferred embodiment of the invention, namely one in which one of the sets of voltages has only two values, a lower and an upper value (although in practice, small deviations may of course occur in the supplied voltages) and the other set comprises three values, a lower, a middle and an upper value.

An important aspect of the memory effect as explained above is that multi-line addressing can be applied.

Figure 9:
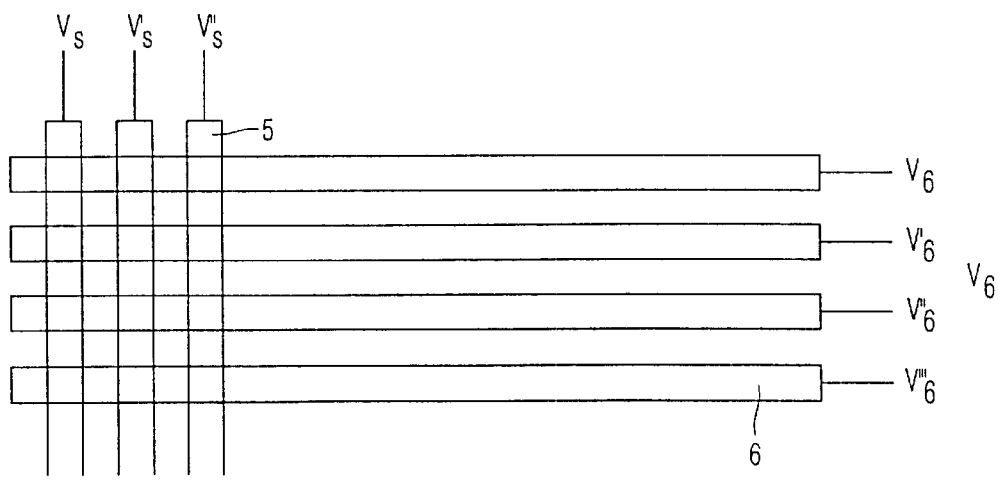
FIG. 9 shows schematically the matrix structure used to form an image.

FIG. 9 illustrates schematically multi-line addressing.

At t=0, all values for $V_6$ are made equal to $V_{6off}$ and all values $V_5$ are made equal to $V_{5off}$. At all crossings of the electrodes, i.e. at all picture elements, the movable element will not be in contact with the light guide. Thus, no light is emitted. At $t=t_1$, the voltage on the top row electrode, i.e. $V_6$, is changed to $V_{6off}$. Video signals are applied to the column electrodes $V_5$, $V_5'$, $V_5''$ etc. Some column electrodes are supplied with 'on' voltages $V_{5l}$ ($V_{5on}$), while others are supplied with 'off' voltages $V_{5h}$ ($V_{5off}$). At the crossing areas of the column electrodes supplied with $V_{5on}$ with the top row electrode, the movable element will be brought into contact with the light guide and light will be scattered. At the other crossing areas no light will be emitted. Subsequently, the second of the top row electrode ($V_6'$) is supplied with voltage $V_{6on}$, while the voltage on the top row electrode is changed to $V_{6hold}$. The column electrodes are supplied with video information corresponding to the second line of the image. This second line of picture elements is formed, while the pixels of the first line that were switched on are still emitting light. Next, the third row electrode is made 'active', i.e. supplied with $V_{6on}$, while the first and second row electrodes are held at a voltage $V_{6hold}$, i.e. remain active. In the further description, the process in which information is written on a line is referred to as 'made active', 'activation' or 'switching', when a line has been activated and, until it is blanked, such a line is referred to as 'active'. When the third line of picture elements is formed (made active), the first two lines are still emitting (active). In a simple scheme, this process is repeated until N lines are written, one of the N lines is blanked and an N+1 line is switched, whereafter another one of the N lines is blanked and an N+2 line is switched. Although, in this example, the image is formed line by line and the lines are activated, going from top to bottom, it will be clear that any sequence of activation of the lines may be used. For instance, sequences wherein subsequently the 1$^{st}$, 6$^{th}$, 11$^{th}$, 2$^{nd}$, 7$^{th}$, 12$^{th}$ lines etc. are activated are possible. This is done by supplying an 'off' voltage to the electrode corresponding to said line and at the same time supplying 'off' signals to all electrodes crossing said electrode.

Grey scales in the picture elements can be made by regulating the percentage of time each crossing area is emitting light (duty cycle modulation).

Although a number or even all lines may be active for some time, only one line may be switched (being made active or blanked) at any one time.

Figure 10:
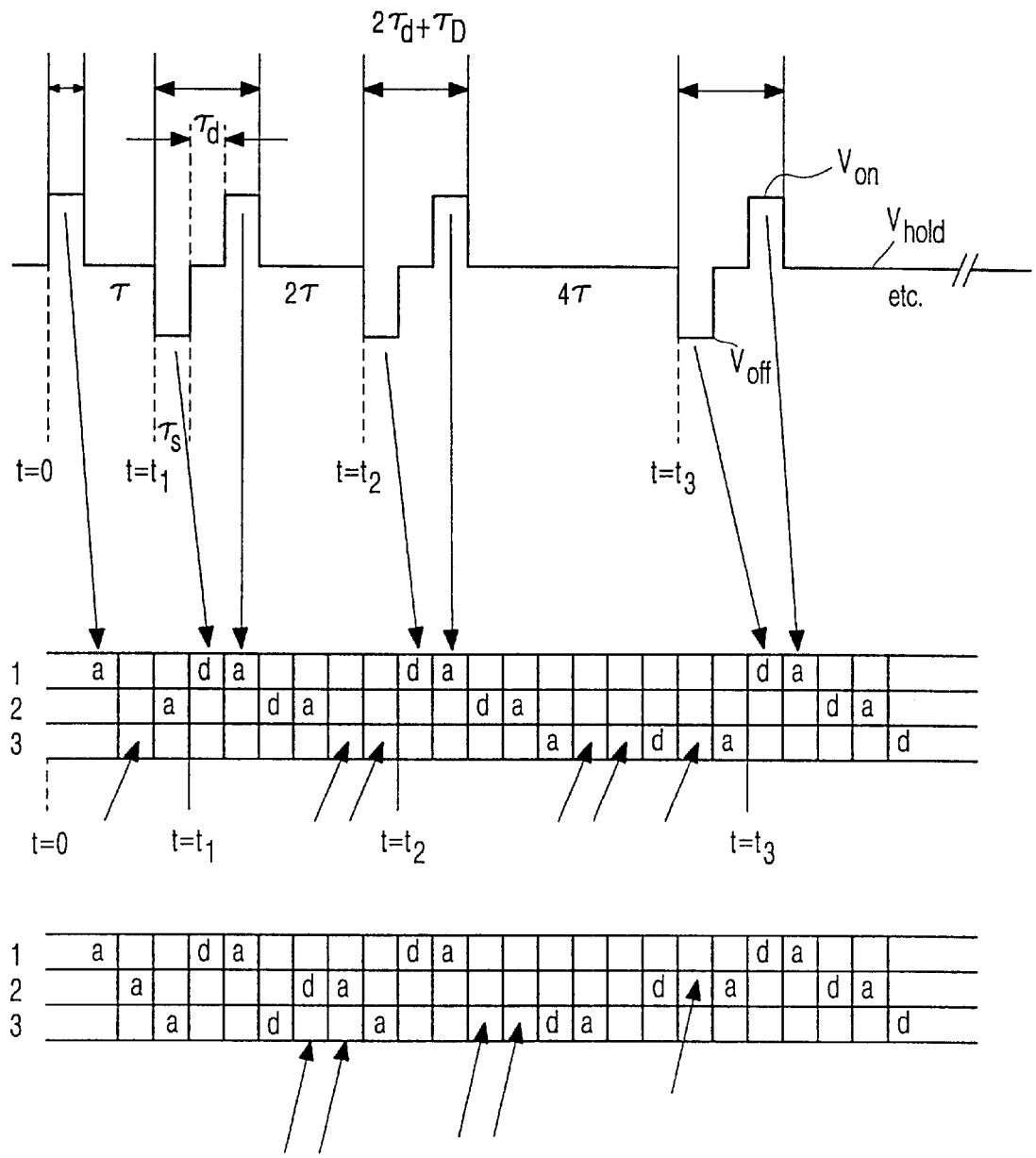
FIG. 10 illustrates schematically a possible addressing scheme to generate grey levels.

FIG. 10 illustrates this. The zigzag line at the upper half of the Figure illustrates the voltages being supplied to a first line. At t=0, a voltage $V_{on}$ is supplied to a row electrode 6. This will activate the line corresponding to said row electrode. Simultaneously, video information (i.e. voltages $V_{on}$ for those crossing areas where the pixel is to be turned on) are supplied to the column electrodes crossing said electrode. At $t=t_1$, the electrode is supplied with a voltage $V_{off}$ and simultaneously all electrodes crossing the electrode are supplied with a voltage $V_{off}$. This will blank the line. This blanking takes time $\tau_s$. After a short waiting time $\tau_d$, the line is activated again. The video information can then be changed for each electrode crossing the relevant line electrode. Thus, the first time the pixel can be one, the second time 2τ off, the third time 4τ on, etc. For an 8-bit grey scale, a complete cycle comprises, for instance, 8 sub-periods of lengths 2, 4, 8, 16, 32, 64 and 128τ, two sub-periods being separated by an "off-on" sequence taking $\tau_s+\tau_d+\tau_s$. The total time each cycle takes is then (1+2+4+8+16+32+64+128) (=255) τ+8(2$\tau_s$+τd). Since, at any one time, only one line may be switched (activated or deactivated), 8(2$\tau_s$+$\tau_d$) must be smaller than the line time.

The lower half of FIG. 10 indicates, by means of time slots for a first electrode 1, a second electrode 2 and a third electrode 3, two different schemes of supplying voltages to the three electrodes. These schemes for 3 active lines, indicated by arrows, show that there are some time periods between a (activation) and d (deactivation). At these time periods, no line is switched.

Absorption of light occurs in the light guide. By regulating time $\tau_d$ or the time periods indicated by the arrows, it is possible to regulate the percentage of time that a line is active. In a preferred embodiment of the invention, the time $\tau_d$ and/or the number of time periods indicated by the arrows are larger than at some distance of the light input. In this manner the percentage of time that light is emitted near a light input is less distant from the light input. Since, however, due to absorption in the light guide, the intensity of the light is greatest near the light input, a better uniformity is obtainable.

Summary, the invention may be described as follows.

A display device has row (5) and column (6) electrodes and a movable element (3) and means (17) for supplying voltages to the electrodes. The means supply, in operation, such voltages ($V_{5on}$, $V_{5off}$, $V_{6on}$, $V_{6off}$, $V_{6hold}$) to the electrodes that use is made of the memory effect of the movable element. More in particular, the electrodes are, in operation, supplied with "on" ($V_{5on}$, $V_{6on}$), "off" ($V_{5off}$, $V_{6off}$) and "hold" voltages ($V_{6hold}$). Simultaneous application of "on" voltages turns a pixel on at the crossing area of the relevant electrodes, while simultaneous application of "off" voltages turns a pixel off. Application of a "hold" voltage on either of the electrodes preserves the state of the pixel. Multi-line addressing of the display device is thereby possible. An important aspect is that grey levels can be made.

It will be obvious many variations are possible that within the scope of the invention without departing from the scope of the appended claims.

What is claimed is:

1. A display device comprising a light guide, a movable element and selection means to locally bring said movable element into contact with the light guide, said selection means comprising row and column electrodes and means for applying voltages to the row and column electrodes, characterized in that the selection means comprise means for applying voltages to the electrodes in dependence on a previously applied voltage or voltages on the electrodes.

2. The display device as claimed in claim 1, characterized in that the means for applying voltages comprises:

a first set of voltages having a lower and an upper value to a row electrode, and a second set of voltages having a lower and an upper value to a column electrode crossing the row electrode at a crossing area, the display device being arranged in such a way that only simultaneous application of a lower value to the row electrode and an upper value to the column electrode, or vice-versa, changes the position of the movable element at the crossing area.

3. The display device as claimed in claim 1, characterized in that the means for applying voltages comprises:

a first set of voltages having a lower and an upper value to a column electrode, and a second set of voltages having a lower and an upper value to a row electrode crossing the column electrode at a crossing area, the display device being arranged in such a way that only simultaneous application of a lower value to the column electrode and an upper value to the row electrode, or vice-versa, changes the position of the movable element at the crossing area.

4. The display device as claimed in claim 1, characterized in that one of the sets of voltages is constituted by a lower and an upper value, the other set of voltages being constituted by an upper, a middle and a lower value.

5. The device as claimed in claim 1, characterized in that the means for applying voltages comprises:

a turn-on voltage to a first row electrode while simultaneously applying voltages to column electrodes crossing said first row electrode to bring the movable element into contact with the light guide at selected crossing areas of the first row electrode, and subsequently the turn-on voltage to a second row electrode, while simultaneously apply voltages to said column electrodes to bring the movable element in contact with the light guide at selected crossing areas of the second row electrode, the voltage at the first column electrode having such a value that the movable elements at the crossing areas of the first row electrode do not detach from the light guide.

6. The device as claimed in claim 1, characterized in that the means for applying voltages comprises:

a turn-on voltage to a first column electrode while simultaneously applying voltages to row electrodes crossing said first column electrode to bring the movable element into contact with the light guide, at selected crossing areas of the first column electrode and subsequently apply the said turn-on voltage to a second column electrode while simultaneously applying voltages to said row electrodes crossing said second column electrode to bring at selected crossing areas at the second column electrode the movable element in contact with the light guide, the voltage at the first column electrode having such a value that the movable elements at the crossing areas of the first row electrode do not detach from the light guide.

7. The device as claimed in claim 1, characterized in that the selection means, in operation, such a sequence of voltages to the row or column electrodes that the percentage of time during which a given row or column electrode is varied is such that the percentage increases with an increasing distance between the relevant row and column electrode and a light input into the light guide.

* * * * *